3,104,228
METHOD OF PREPARING AN EXTRUDED COBALT-MOLYBDENUM-ALUMINA CATALYST
Robert F. Vance and John F. Strotman, Louisville, Ky., assignors to Chemetron Corporation, Chicago, Ill., a corporation of Delaware
No Drawing. Filed Dec. 11, 1958, Ser. No. 779,574
5 Claims. (Cl. 252—465)

This invention relates generally to catalytic hydrogenation of petroleum stocks and fractions and more particularly to an improved cobalt-molybdenum-alumina catalyst suitable for hydrodesulfurization and other hydrogenation reactions and to the method of manufacturing such improved catalyst.

Many petroleum stocks contain sulfur compounds such as mercaptans, thiophenes and organic sulfides in small amounts, and these sulfur compounds have proved to be highly undesirable impurities, particularly when gasolines containing tetraethyl lead as an antiknock agent are to be produced. The presence of as little as about 0.05% sulfur in such fractions greatly increases the amount of tetraethyl lead which must be added in order to achieve a desired octane rating. Accordingly, it has been found to be desirable to reduce the sulfur content to around 0.01% (100 p.p.m.). Hydrodesulfurization is a convenient method of reducing the sulfur content to this range. This process involves reacting the organic sulfur compounds with hydrogen in the presence of a hydrogenation catalyst to convert the sulfur to hydrogen sulfide which may be readily separated from normally liquid fractions.

Compounds of cobalt and molybdenum have been used for many years for such hydrodesulfurization as well as other hydrogenation reactions and, because both of these metals are costly, many different forms of supported catalysts have been developed in which minor amounts of the catalytic materials are incorporated on carrier materials such as alumina.

The present invention is directed to a cobalt-molybdenum catalyst on an alumina carrier which can be extruded to form extrusions which after drying are extremely active in the hydrodesulfurization of petroleum stocks and which are physically strong and capable of high temperature regeneration without deterioration. Cobalt-molybdenum catalysts on alumina have been prepared in the past but such materials are virtually impossible to extrude in the form of strong cylindrical extrusions. For this reason, such catalysts in the past have usually been marketed in the form of pressed pellets. There are obvious economic advantages to the method of producing a catalyst by extrusion rather than by pelleting. Not only is the process considerably simplified, but equipment requirements are substantially less and the rate of production is significantly increased. A further advantage is that the catalyst prepared by extrusion according to the present invention has a lower density than tableted catalysts of the same cobalt and molybdenum composition.

Briefly, the present invention comprises a method of manufacturing extruded cobalt-molybdenum catalysts wherein alumina is the support material by adding a controlled amount of strong acid to the mixture of cobalt and molybdenum compounds with alumina. Sufficient water is added to reduce the mixture to a somewhat fluid consistency suitable for extrusion and the batch is passed through a suitable die, preferably of stainless steel, to form cylindrical or other shaped extrusions. The extruded material is then dried and/or calcined at high temperature to drive off the water and convert the cobalt and molybdenum compounds to oxides supported on the alumina carrier.

The method of catalyst manufacture which we have discovered for producing the novel extruded cobalt-molybdenum catalysts on an alumina support comprises mixing alumina hydrate and molybdenum oxide (or a molybdenum compound, such as molybdic acid or ammonium molybdate which will form a molybdenum oxide when heated above about 600° F.) with an aqueous solution of a cobalt salt which is convertible to cobalt oxide upon calcination at the aforesaid temperature. In the preferred mixing procedure, the molybdenum and cobalt compounds are dispersed uniformly throughout the alumina and a damp solid mixture is formed. Then a strong acid, such as nitric acid, is added in a controlled amount to convert the damp solid into an extrudable paste. Other strong acids such as hydrochloric, sulfuric and oxalic are also suitable. When the acid is nitric acid, the amount of acid selected should range from about 2.5% to 10% of the total weight of the finished product, 5% being preferred. With other mineral acids mole equivalent quantities of acid are selected. Sufficient water is added to the mixture, simultaneously and/or subsequently, to form an extrudable paste and the catalyst mixture is passed through a die or other apparatus to form extrusions which are then calcined at temperatures up to about 1,000° F. to evaporate the moisture, decompose the salts of cobalt and molybdenum, paritally dehydrate the alumina and convert the extrusions into hard catalyst pellets which have great physical strength and will withstand repeated regeneration without appreciable deterioration. The preferred calcining temperature is in the range of 600° to 1,000° F.

Certain variations from the above-described preferred procedure may be employed is desired. For example, the acid addition may be made simultaneously with rather than after incorporation of the cobalt and molybdenum compounds, if the compounds utilized are compatible with the acid used. Moreover, it is not necessary that the acid be highly concentrated at the time of addition and, if desired, all or some of the water added to adjust the composition to an extrudable paste may be mixed with the acid prior to addition of the acid to the mixture.

Catalysts produced in accordance with this general procedure have increased catalytic activity, particularly in the dehydrosulfurization of petroleum stocks and compare favorably with pelleted catalysts produced by more complicated and less efficient procedures. The procedure of this invention has the significant advantage of simplicity in that the catalyst materials may be incorporated in one mixing procedure and formed directly into suitable catalyst shapes without the added steps required for more conventional preparations.

The carrier or support material used in forming the extruded catalyst according to this invention is alumina. Preferred is a hydrated alumina, such as that containing approximately equal proportions of beta-$Al_2O_3 \cdot 3H_2O$ and alpha-$Al_2O_3 \cdot H_2O$ which upon calcination at a temperature in the range of 700° to 900° F. is converted largely to gamma-$Al_2O_3$. Other hydrated aluminas, such as alpha-$Al_2O_3 \cdot 3H_2O$, may be used in producing the catalyst. Likewise, calcined or otherwise dehydrated alumina can be used. During the calcination of the extruded alumina catalyst, high temperatures should be avoided or "dead burned" alumina may result. Accordingly, it is preferred to calcine the catalyst at a temperature in the range of 600° to 1,000° F. The amount of water used in preparing the extrudable paste is selected with regard to the consistency of the mixture after the acid has been added. A certain amount of water is added with the acid and the additional water which may be required to produce an extrudable mass is selected by simple experimentation to achieve a paste of the proper consistency.

It has been found that improved color of cobalt-containing catalysts may be achieved if a nonvolatile organic material is included in the catalyst composition prior to calcination. For instance, a small quantity of aluminum stearate or other fatty acid salt has been found to improve the color of the catalysts, presumably by decomposing to alumina and carbonaceous material which acts as a reducing agent. The carbonaceous material apparently prevents the oxidation of the blue cobalt compound or compounds to black or brown cobalt compounds such as $Co_2O_3$ or $Co_3O_4$. Other carbon-containing compounds such as starch, wood flour, synthetic resins (e.g. polyvinyl acetate) and similar organic materials can be used for the same purpose. Graphite and lamp black can also be used. The addition of carbon-containing materials to the catalyst compositions is particularly important when oxidizing agents such as nitric acid are present, but is also desirable in the event that the calcination of the catalyst is carried out in an atmosphere where air or other oxygen-containing gases are present.

The carbon-containing material has no substantial effect on the activity of the catalyst but merely appears to prevent the formation of dark oxides of cobalt which detract from the otherwise attractive deep blue color of the catalyst, and it in some cases appears to form smoother extrusions of lower density than are formed otherwise. The amount of carbon-containing material in the catalyst compositions prior to calcination may vary over fairly wide ranges. Generally it is desirable to have at least one atom of carbon present for each molecule of cobalt compound but substantial excesses are not disadvantageous. The cobalt catalyst compositions containing the organic material or carbon may be extruded as illustrated herein or may be pressed into pellets or tablets. In either form the catalyst compositions are calcined at high temperature, usually in the range of 600° to 1,000° F., although higher temperatures not exceeding the sublimation or decomposition temperatures of the metal oxides may be used.

The atomic ratio of cobalt to molybdenum in the catalysts may vary from 1:5 to 1:1. The relative quantities may be controlled by adjusting the amounts of molybdenum oxide and cobalt salt used in the initial steps of the catalyst manufacture. The cobalt salt may be any cobalt salt which is soluble in water and convertible to the oxide upon calcination, such as cobalt chloride, cobalt nitrate and cobalt sulfate. In practice it is preferred to dissolved cobalt metal in a suitable acid such as nitric acid to produce the solution of cobalt salt because in this way the amount of cobalt can be carefully controlled. The pH of the solution must be less than about 7 or the cobalt may precipitate prematurely. The amounts of catalytically active materials should usually be as small as possible consistent with the required activity to accomplish the desired reaction. The minimum amount may usually be determined with little difficulty by laboratory tests made upon the petroleum stock to be treated. Generally speaking, the amounts of cobalt and molybdenum in the catalyst will fall within the ranges given below:

| | Percent |
|---|---|
| Cobalt as CoO | 1 to 5 |
| Molybdenum as $MoO_3$ | 2 to 20 |

The remainder of the catalyst is carrier.

In the preferred method of producing the catalyst, 100 parts of hydrated alumina (for example, a mixture of beta-$Al_2O_3 \cdot 3H_2O$ and alpha-$Al_2O_3 \cdot H_2O$ or a mixture of anhydrous $Al_2O_3$ and beta-$Al_2O_3 \cdot 3H_2O$) are mixed with 1.5 to 3.0 parts of CoO (or its equivalent in the form of a water-soluble salt such as cobalt nitrate), 5 to 15 parts of $MoO_3$, 1 to 5 parts of starch (corn starch) and 2.5 to 10 parts of concentrated (63%) nitric acid with sufficient water to form a paste of proper consistency for extrusion. The water is added in portions as the mixture is blended in a muller and the proper consistency is readily recognized. Then the paste is extruded through a die and the extrusions are calcined at a temperature in the range of 700° to 1,000° F. The catalyst thus formed has a uniform blue color, and is strong and durable as well as highly active in the desulfurization of petroleum stocks.

Cobalt-molybdenum catalysts made in accordance with this invention have demonstrated unusually high activity and stability, as well as long life. For instance, they consistently reduce the sulfur content of petroleum stocks from values greater than 1,000 p.p.m. to values near 200 p.p.m. at hourly liquid space velocities of 1 or higher. These results compare favorably with those obtained with cobalt-molybdenum catalysts made by conventional but more complicated procedures.

The following example is illustrative of methods of preparing catalysts within the limits of this invention and also the test procedure illustrates the activity of such catalysts in the dehydrosulfurization of petroleum stocks. The example is given for the purpose of illustrating the invention but is not to be construed as limiting it in scope. It will be readily appreciated by those skilled in the art that numerous modifications in conditions, concentrations, relative quantities of materials and the like may be made without departing from the invention. For example, if desired, nickel oxide may be incorporated in place of some of the cobalt oxide in the finished catalyst by substituting a nickel compound for some of the cobalt compound in the formula and obtaining a cobalt-nickel-molybdenum catalyst.

EXAMPLE 1

A mixture of 100 lbs. of hydrated alumina (27% water), 4 lbs. of corn starch and 9 lbs. of molybdenum trioxide were dry mulled together for approximately 20 minutes. The hydrated alumina comprised approximately equal proportions of beta-$Al_2O_3 \cdot 3H_2O$ and alpha-$Al_2O_3 \cdot H_2O$. Then 26.5 lbs. of an aqueous solution of cobalt nitrate (sp. gr. 1.196) containing 1.8 lbs. of CoO was added and the mixture wet mulled for approximately 10 minutes. The cobalt nitrate solution was prepared by dissolving cobalt metal in dilute nitric acid and controlling the excess of acid so that not more than 2% free acid was present. Next 2.5 lbs. of nitric acid (63%) diluted with water was added and wet mulling continued. Additional water (a total of approximately 4.5 gal.) was added to give a paste which was readily extrudable. The catalyst paste was then extruded through a ⅛ inch stainless steel die and the extrusions were calcined for 1 hour at 400° F., 1 hour at 650° F. and 6 hours at 950° F. The catalyst thus formed had a deep uniform blue color and showed on analysis 3.2% CoO and 9.7% $MoO_3$. It had a side crush strength of 12.1 lbs. dead weight load (DWL), an abrasion loss of only 3.8% and a bulk density of 50 lbs. per cubic foot.

Test Procedure

The catalyst produced in Example 1 was evaluated at standard diesel fuel test conditions according to the following procedure:

The test catalyst was first sulfided by placing a batch of catalyst pellets in a stainless steel tubular reactor surrounded by a jacket space containing heated Dowtherm. Hydrogen sulfide gas at atmospheric pressure was passed over the catalyst for a period of two hours during which time the temperature within the reactor was maintained at 700° F. by the heated Dowtherm in the jacket space. The purpose of subjecting the catalyst to hydrogen sulfide was to initially sulfide any portions of the catalyst susceptible of taking up sulfur in order to obtain more accurate readings in the following test of the catalyst's ability to desulfurize petroleum stock.

A straight run No. 2 diesel fuel containing about 1400 p.p.m. of organic sulfur was pumped through a preheater where the temperature was raised to 650–700° F. and then hydrodesulfurized over a 50 cc. bed of sulfided catalyst at 700° F. in the presence of hydrogen feed gas (80% hydrogen, 20% methane) at the rate of 1500 s.c.f./bbl. at 300 p.s.i.g. at a liquid hourly space velocity of 3. (It is preferred to conduct comparative tests of this kind at somewhat higher space velocities than it is anticipated will be employed in commercial operation in order to obtain a better spread of results.) The catalyst of Example 1 reduced the sulfur content of the effluent to 150 p.p.m. at a liquid hourly space velocity of 3.

What is claimed as new and is desired to be secured by Letters Patent of the United States is:

1. A method of producing an extruded catalyst containing cobalt oxide and molybdenum oxide on an alumina carrier which comprises mixing alumina, a carbon-containing material selected from the group consisting of carbonaceous reducing agents and materials which decompose to carbonaceous reducing agents at calcination temperature, a molybdenum compound chosen from the group consisting of molybdenum oxide and a molybdenum compound which upon heating forms molybdenum oxide, and a cobalt compound chosen from the group consisting of cobalt oxide and a cobalt compound which upon heating forms cobalt oxide with 2.5% to 10% by weight based on the finished catalyst of a strong acid and sufficient water to form a paste of proper consistency for extrusion, extruding said paste through an orifice to form an extruded shape, and calcining said extruded shape at a temperature in the range of 400° to 1,000° F. to evaporate the water, to at least partially activate the alumina by driving off water of hydration and to stabilize the cobalt by converting it to its oxide.

2. The method of claim 1 wherein the alumina is a mixture of beta-$Al_2O_3 \cdot 3H_2O$ and alpha-$Al_2O_3 \cdot H_2O$.

3. The method of claim 2 wherein the carbon-containing material is a carbohydrate and is present in an amount equivalent to at least one atom of carbon per molecule of cobalt compound.

4. The method of claim 3 wherein the acid is nitric acid.

5. A method of preparing a blue extruded cobalt-molybdenum-alumina catalyst which comprises mixing 100 parts of hydrated alumina, 1.5 to 3.0 parts of CoO in the form of a water-soluble salt, 5 to 15 parts of $MoO_3$ 1 to 5 parts of starch and 2.5 to 10 parts of concentrated nitric acid with sufficient water to form a paste of extrudable consistency, extruding said catalyst paste through a die and calcining the resulting extrusions at a temperature in the range of 700° to 1,000° F.

References Cited in the file of this patent
UNITED STATES PATENTS

| | | |
|---|---|---|
| 2,409,494 | Keating | Oct. 15, 1946 |
| 2,687,381 | Hendricks | Aug. 24, 1954 |
| 2,809,170 | Cornelius | Oct. 8, 1957 |
| 2,878,193 | Scott | Mar. 17, 1959 |
| 2,938,002 | Keith et al. | May 24, 1960 |
| 3,020,244 | Dienes | Feb. 6, 1962 |